Patented Sept. 29, 1942

2,297,636

UNITED STATES PATENT OFFICE 2,297,636

COMPOSITION FOR AND METHOD OF DE-VITALIZING MICROORGANISMS

Randolph Norris Shreve, West Lafayette, Ind., and Miller Woodson Swaney, Elizabeth, N. J., assignors to Mallinckrodt Chemical Works, St. Louis, Mo., a corporation of Missouri No Drawing. Original application May 19, 1938, Serial No. 208,860, now Patent No. 2,216,140, dated October 1, 1940. Divided and this application March 30, 1940, Serial No. 326,968

2 Claims. (Cl. 167—33)

This invention relates to compositions for and methods of devitalizing microorganisms, and with regard to certain more specific features, to such compositions including pyridylmercuric compounds as active constituents thereof.

This application is a division of our copending application Serial No. 208,860 filed May 19, 1938, now Patent 2,216,140, which in turn is a continuation-in-part of our application Serial No. 35,626, filed August 10, 1935, and was copending therewith.

Among the several objects of the invention may be noted the provision of compositions of the class described which are of enhanced devitalizing powers, without exhibiting undesirable toxic characteristics, and which have enhanced solubility over prior analogous compositions; the provision of methods of devitalizing microorganisms employing new compositions of matter for this purpose; and the provision, as new compositions of matter, of a new pyridylmercuric compound valuable as a microorganism-devitalizing agent. Other objects will be in part obvious and in part pointed out hereinafter.

The invention accordingly comprises the elements and combinations of elements, steps and sequence of steps, and features of composition and procedure, which will be exemplified in the products and methods hereinafter described, and the scope of the application of which will be indicated in the following claims.

Many metallo-organic compounds, such as organic compounds of mercury, have heretofore been found to be valuable devitalizing agents for microorganisms. A particular class of mercury compounds that have been found satisfactory are the phenylmercuric salts, but these are frequently but slightly soluble in water, this feature obviously decreasing their utility. The present inventors have discovered that pyridylmercuric compounds, and, more specifically, the salt pyridylmercuric chloride, likewise possess valuable microorganism-devitalizing properties. Bacteriostatic tests in some instances, as for example against *B. coli*, show that the pyridylmercuric compounds are more powerful than the corresponding phenylmercuric compounds. The pyridylmercuric compounds are generally more soluble in water, whereby they may be prepared in more concentrated aqueous solutions. For this reason alone, they comprise a more advantageous devitalizing agent than the analogous phenylmercuric salts.

A general method for preparing pyridylmercuric chloride is as follows: Pyridine and mercuric acetate are reacted together, giving pyridylmercuric acetate according to the equation.

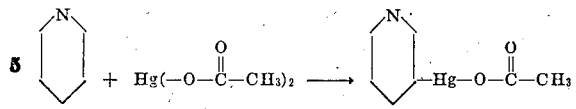

From the pyridylmercuric acetate thus formed, pyridylmercuric chloride may be formed, by treatment as indicated in the following equation:

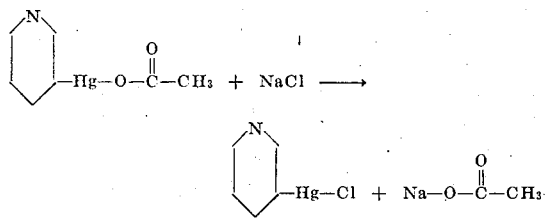

The actual laboratory procedure may be as follows:

Mercuric acetate (100 grams) and pyridine (200 cc.) are heated together in a glass-lined autoclave for two hours at 180° C. After cooling, the product (175 cc.) is filtered from the insoluble residue (33.5 grams) and placed in a vacuum distillation apparatus. From this, at least 140 cc. of pyridine may be removed and recovered. The residue in the flask, a dark tarry substance, is transferred to a beaker and covered with 100 cc. of ether. After slow stirring for some time the mass becomes granular. The granular mass, which is the crude acetate, is filtered and dried. It melts at 135 to 145° C. The crude acetate is then extracted with hot benzene with the aid of a small amount of norite. After filtering, the benzene is allowed to cool, and white feathery needles of the pure pyridylmercuric acetate separate out. This product is desirably again recrystallized from benzene, and finally from carbon tetrachloride. The pure acetate, in the form of white feathery needles, melts at about 178° C. It is very soluble in both water and alcohol.

A portion of the pure pyridyimercuric acetate is dissolved in water and a dilute solution of sodium chloride is added slowly with stirring. Pyridylmercuric chloride, in the form of a white crystalline powder, separates out. Upon recrystallization from water, this salt comes out in slender white needles melting at about 278 to 280° C., with some decomposition.

The pyridylmercuric chloride described was shown to have the mercury atom attached to the 3- or beta-carbon atom in the pyridine nucleus. The mercury-carbon linkage, although considered a rather stable linkage, is rather easily broken by halogens, the halogens replacing the mercury atom. Thus, 40 grams of the above pure pyridylmercuric chloride was finely powdered and suspended in 80 cc. of water containing 50 grams of potassium bromide. To this was added gradually 20 grams of bromine with stirring. After all of the bromine had been added the mixture was heated gently on a water bath for 15 minutes. After cooling, the mixture was made alkaline with potassium hydroxide, and steam distilled. About 75 cc. of distillate was collected; this was extracted with several small portions of ether. The ether extracts were combined, and the ether evaporated, leaving an oil. This oil was distilled, and a portion (3 grams) collected at 171–172° C. This, according to its boiling point, is 3-bromopyridine. It was further confirmed as 3-bromopyridine by making its picrate, which melted at 152–154° C. It also compared with a known sample of 3-bromopyridine.

The microorganism-devitalizing activity of the pyridylmercuric chloride of the present invention is particularly well demonstrated in its antiseptic activity with respect to various forms of bacteria. For example, tests in vitrio have shown the following activities:

| | Bacteriostatic index, or maximum effective dilution in aqueous solution, against— | |
|---|---|---|
| | *Staphylococcus aureus* | *Bacillus colon* |
| 3-pyridylmercuric chloride (pure) | 1,000,000–2,000,000 | 550,000–1,200,000 |
| 3-pyridylmercuric chloride (crude) | 500,000 | 500,000 |

The bacteriostatic index of the above table was determined in accordance with the method of Tetrault, which is as follows:

To a sterile tube containing a known quantity of the pyridylmercuric chloride in aqueous solution, 9.5 cc. of a sterile agar solution containing 2% agar, 1% peptone, and 0.3% beef extract is added. One 2 mm. loopful of a twenty-four culture of the organism is then added to the tube. The contents of the tube are then poured into a petri dish and incubated at 37° C. for forty-eight hours. The dish is then examined for growth of the organism. The experiment is repeated for different dilutions of the substance until a dilution is reached beyond which growth takes place. This dilution is expressed as cubic centimeters of water per gram of substance, and is the bacteriostatic index of the foregoing table.

The pyridylmercuric chloride of the present invention is likewise found to be relatively non-toxic to mammals when used in bacteriostatic dosages.

The relatively increased solubility of the compound of the present invention in comparison, for example, with the analogous phenylmercuric compound, in water is important, because it thereby becomes possible to prepare relatively stronger aqueous solutions which are exceedingly effective in devitalizing bacteria and microorganisms of other types.

Not only is the compound of the present invention useful as a bacteriostatic or antiseptic agent, but it is also of demonstrable utility as a disinfectant, for seed disinfection, for example, and as a fungicide, for preventing the moulding or decay of wood pulp, paper, and paints, for example. In such uses, which are of an industrial character, the compound of the present invention can be used directly in its crude condition, without necessarily being purified.

In general, for its antiseptic use, the compound of the present invention is employed in its aqueous solutions, where it presents the cation R—Hg+. Antiseptic or bacteriostatic effects are then secured merely by applying the solution to the microorganisms in the infected location, in any of the known methods of application. The compound is also effective in other solvents, for example alcohol, or an alcohol-acetone mixture, or it may, with satisfaction, be incorporated into ointments, with a greasy or unguent vehicle. In some circumstances, it may even be used in powdered solid form, for dusting on the infected location.

In view of the above, it will be seen that the several objects of the invention are achieved and other advantageous results attained.

As many changes could be made in carrying out the above compositions and methods without departing from the scope of the invention, it is intended that all matter contained in the above description shall be interpreted as illustrative and not in a limiting sense.

What is claimed is:

1. A microorganism devitalizing composition comprising pyridylmercuric chloride.

2. The method of devitalizing microorganisms which comprises subjecting them to the action of pyridylmercuric chloride.

RANDOLPH NORRIS SHREVE.
MILLER WOODSON SWANEY.